United States Patent [19]
Caram et al.

[11] Patent Number: 5,163,045
[45] Date of Patent: Nov. 10, 1992

[54] COMMUNICATIONS NETWORK ARRANGED TO TRANSPORT CONNECTION ORIENTED AND CONNECTIONLESS MESSAGES

[75] Inventors: Bruce E. Caram, Branchburg; Ronald C. Roposh, Flemington; Harvey Rubin, Morristown, all of N.J.

[73] Assignee: AT&T Bell Laboratories, Murray Hill, N.J.

[21] Appl. No.: 591,182

[22] Filed: Oct. 1, 1990

[51] Int. Cl.⁵ .................... H04J 3/24; H04Q 11/04
[52] U.S. Cl. .................... 370/60.1; 370/60; 370/94.1
[58] Field of Search .......... 370/58.1, 58.2, 58.3, 370/60, 60.1, 94.1, 110.1; 340/825.5, 825.51, 825.52

[56] References Cited

U.S. PATENT DOCUMENTS

| | | | |
|---|---|---|---|
| 4,661,902 | 4/1987 | Hochsprung et al. | 364/200 |
| 4,764,919 | 8/1988 | Hunter et al. | 370/60 |
| 4,858,232 | 8/1989 | Diaz et al. | 370/85.7 |
| 4,884,263 | 11/1989 | Suzuki | 370/60 |
| 4,905,231 | 2/1990 | Leung et al. | 370/94.1 |
| 4,907,220 | 3/1990 | Rau et al. | 370/60 |
| 5,014,266 | 5/1991 | Bales et al. | 370/58.1 |

Primary Examiner—Douglas W. Olms
Assistant Examiner—Alpus H. Hsu
Attorney, Agent, or Firm—F. B. Luludis

[57] ABSTRACT

A communications system that is arranged to transport so-called connection oriented messages via respective virtual circuit connections is enhanced so that it also transports so-called connectionless messages via a predefined virtual circuit connection that is common among those data modules which participate in the connectionless message service. In particular, each module which participates in the connectionless message service is assigned, in addition to a primary address that is used in conjunction with associated channels numbers to transport respective connection oriented messages, a common address and a channel number that is used solely for transporting connectionless messages. In this way, the communications system processes connectionless messages as though they were connection oriented messages.

9 Claims, 6 Drawing Sheets

FIG.2

| | ADDRESS | CHANNEL NUMBER | |
|---|---|---|---|
| 0 | | | |
| ⋮ | | | |
| 7 | 32 | 64 | } 120-1 |
| ⋮ | | | |
| 15 | | | |
| | | | |
| 0 | | | |
| ⋮ | | | |
| 64 | 8 | 7 | } 120-3 |
| ⋮ | | | |
| 255 | | | |

120

COMMUNICATIONS NETWORK ARRANGED TO TRANSPORT CONNECTION ORIENTED AND CONNECTIONLESS MESSAGES

TECHNICAL FIELD

The invention relates to communications networks, and more particularly relates to communications networks adapted to transport both connection oriented and connectionless messages.

BACKGROUND OF THE INVENTION

In a virtual circuit packet switch, a so-called virtual circuit connection needs to be established between a pair of data modules before the modules may exchange messages with one another. (The connection is virtual because the bandwidth of the intermodule transmission medium is used to transport data between the modules only when the modules have data to send. Otherwise, the transmission bandwidth may be used to send data for a different virtual connection that is established over the medium. Thus, the transmission is shared among a set of data modules). Such a virtual circuit connection is therefore defined by associated translation data comprising the modules' respective addresses and associated channel numbers. Such data is generated as a result of a call set-up procedure that is initiated by one of the data modules, and is stored in a translation memory referred to as the switch. The packet switch uses the translation data to route a message between the pair of modules by translating the contents of an associated address and channel field identifying the originator of the associated message into the address and channel number identifying the intended destination, in which, for virtual circuit service, the address-channel number pairs are unique across the modules on a packet switch. In this sense, the virtual circuit connection is selectively activated by virtue of the presence of the associated translation data.

A message which is transported via a virtual circuit connection is commonly referred to as a "connection oriented" message, which is unlike a so-called "connectionless" message. A connectionless message is a message that is transported on the "fly" and, therefore, is not preceded by a call set-up procedure involving the generation of associated translation data between specific modules. A connectionless message reaches its intended destination as a result of the originator inserting in the message the address of the destination and then having the switching and transmission mechanisms route the messages to the set of modules capable of receiving connectionless messages.

It can be appreciated from the foregoing that if the virtual circuit packet switch were presented with a connectionless message, then the switch would either misroute or discard the message. The reason for this is that the switch would not have in place the appropriate translation data defining a respective virtual circuit connection between the originator and destination of the connectionless message. Consequently, the inability to transport (route) connectionless messages limits the application of a virtual circuit packet switch to transporting just connection oriented messages.

SUMMARY OF THE INVENTION

An advance in the art of packet switching is obtained by arranging a virtual circuit packet switch so that the switch properly transports both connection oriented and connectionless messages. Specifically, in accordance with an aspect of the invention, a common, quasi-virtual circuit connection is pre-established among those modules of a virtual circuit packet switch that are arranged to transport connectionless messages. In this way, the virtual circuit packet switch uses predefined translation data to transport from a source module to a set of potential destination modules a connectionless message, in which the predefined translation data comprises, in accordance with an aspect of the invention, a secondary module receiving address and associated channel number that is commonly recognized by the participating connectionless transport modules on the packet switch. Thus, a virtual circuit packet switch, arranged in accordance with the invention, processes a connectionless message in the same way that it processes a connection oriented message.

In particular, in addition to its unique module transmit/receive address (i.e., the primary address) for connection-oriented service, each module which also participates in connectionless message service is assigned, in accordance with an aspect of the invention, a common receive (secondary) address, which has a unique value and which is reserved for the transmission of connectionless messages. When a source transmits over the common transmission medium, or broadcast bus, a connectionless message the source inserts in a predefined identifier field its unique transmit address and its reserved channel number. The associated packet switch, in turn, (a) translates the contents of the identifier field into the common address and a channel number that is arbitrary for the purpose of this invention, but which may be set to the transmit address of the source, (b) loads the resulting translation into the message identifier field, (c) and places the modified message onto the common broadcast bus. In addition, each module which participates in the connectionless message service monitors the broadcast bus for messages whose identifier field contain either the module's unique primary address or common secondary address. In this way, each such module accepts from the common broadcast bus either a connectionless message containing the common secondary address or a connection oriented message containing its respective unique primary address.

BRIEF DESCRIPTION OF THE DRAWINGS

In the drawings:

FIG. 2 illustrates a translation table which is stored in memory associated with the LAN of FIG. 1 and which provides the means for establishing a virtual circuit connection;

GENERAL DESCRIPTION

Figure 1:
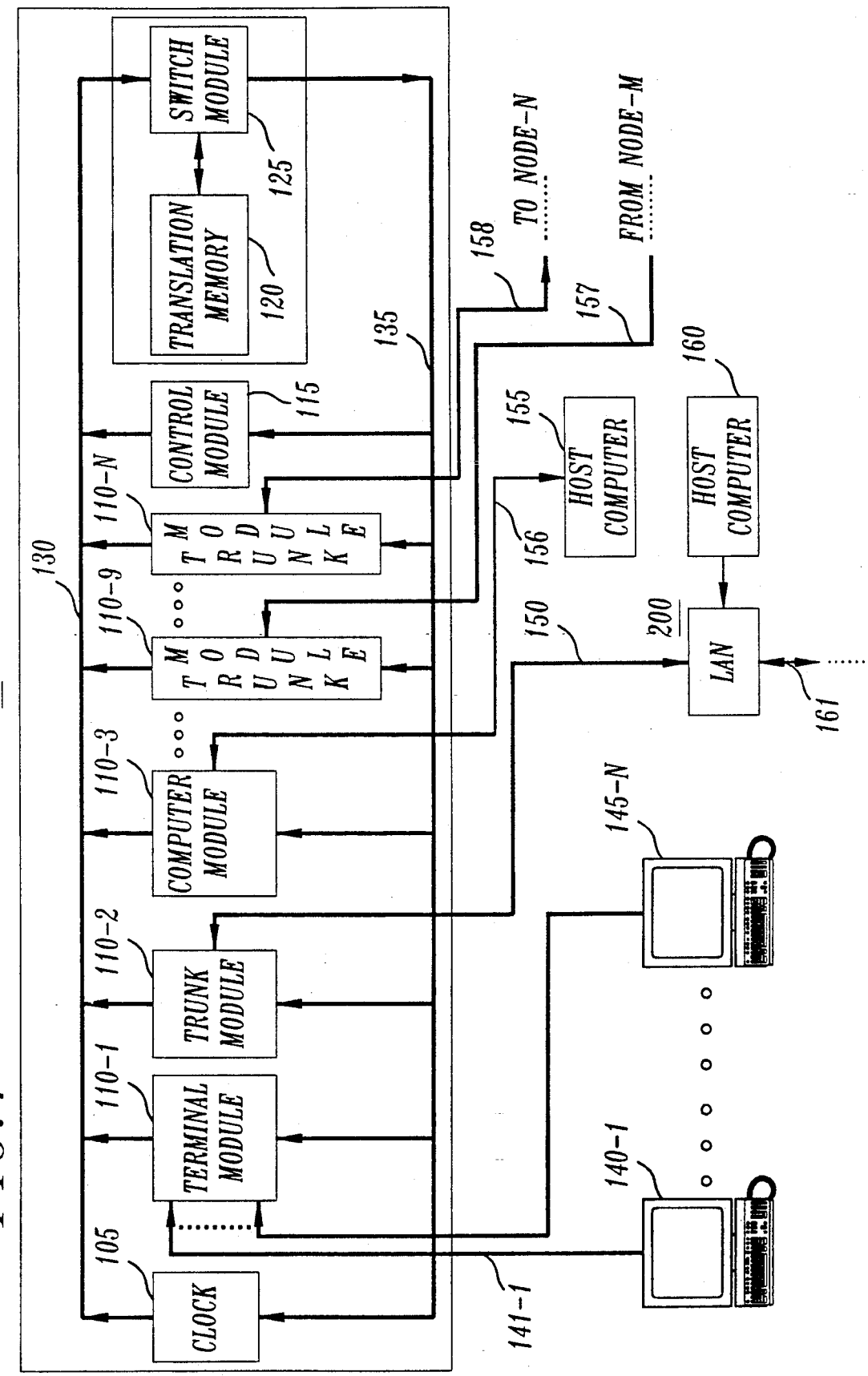
FIG. 1 is a broad block diagram of a network of nodes in which at least of one the nodes may be a so-called Local Area Network (LAN) in which the principles of the invention may be practiced.

FIG. 1 shows a broad block diagram of a communications network 100. Communications network 100 is commonly referred to as a so-called Local Area Network (LAN), which may be, for example, the well-known Datakit ® virtual circuit switch that is commercially available from AT&T. LAN 100 comprises clock module 105 and a plurality of port modules. LAN 100 also includes a so-called printed wire backplane equipped with connectors (not shown) for respectively receiving circuit (port) modules 110-1 through 110-N, control module 115 and switch module 125. The printed wire backplane implements a transmit bus 130 and a broadcast bus 135. The backplane also provides signal distribution from clock module 105 to the other modules.

A port module, e.g., terminal module 110-1, that is plugged into a backplane connector is automatically connected to busses 130 and 135. Bus 130 operates to transport to switch module 125 a data message placed on bus 130 by one of the port modules. Bus 135, on the other hand, operates to transport a data message from switch module 125 to the other modules which monitor bus 135. Control of bus 130 is based on a conventional priority contention scheme employing module number, and is implemented in each of the port modules 110-1 through 110-N, including control module 115. Thus, a port module, e.g., port 110-1, contends for control of the bus to send a message to another port module, e.g., port 110-3. When it gains such control, the sending port may then place on bus 130 a packet message containing the primary module address identifying the source of the message as well as a channel number. Switch 125 responsive to receipt of the message instantiates the virtual circuit connection between the source and recipient by using the switch translation memory 120 to translate the source address and channel number into the destination address and channel number.

In the operation of LAN 100, control module 115 assigns to each of the port modules 110-1 through 110-N a number of contiguous locations in memory 120 based on the function that the port module performs. It is seen from the Figure that each port module operates to serve a particular device or a number of particular devices. For example, terminal module 110-1 serves a number of computer terminals. Accordingly, control module 115 assigns to module 110-1 a like number—illustratively 16—of memory 120 locations. Module 110-1, in turn, associates those memory locations with respective data channels, in which each such data channel may be used to transmit a message to another device. Similarly, control module 115 assigns to port module 110-3 a number of memory 120 locations based on the function performed by the latter module. Since module 110-3 serves a host computer capable of serving, in turn, and via LAN 100, a large number of user terminals, e.g., terminal 140-1, then control module 115 assigns to module 110-3 a large number—illustratively 256—contiguous memory 120 locations. Similarly, module 110-3 associates its assigned memory 120 locations with respective data channels.

With the foregoing in mind, we now briefly discuss the manner in which LAN 100 transports connection oriented messages between a pair of devices, for example terminal 140-1 and host computer 155. We will then go on to briefly discuss the manner in which such messages are transported between LANs e.g., between LANs 100 and 200. It is to be understood, of course, that the following discusses just one of many different ways that the desired communications may be effected in accordance with the principles of the invention.

Specifically, to initiate a service request asynchronous terminal 140-1 connected to module 110-1 via RS232 interface 141-1 activates its associated "data terminal ready" lead. Module 110-1 responsive thereto returns to terminal 140-1 via interface 141-1 a message requesting a destination. Terminal 140-1, in turn, and under the control of a user positioned at terminal 140-1, supplies to module 110-1 the identity of the device that the user desires to access, e.g. host computer 155. Module 110-1 responsive to receipt of such identity forms a message requesting a connection to the named device in which the header of the message contains, inter alia, (a) the identity of the source of the message, namely, the circuit number (address) assigned to module 110-1, which is assumed herein to be address eight; and (b) the identity of a signaling channel associated with control module 115. Module 110-1 also includes in the message the identity of one of its data channels that it will use for the connection. (It will be assumed herein that the address of the latter data channel is seven.) Module 110-1 then transmits the message to bus 130 after being granted access thereto. (Hereinafter, any reference that is made to transmitting or placing a message on bus 130 will be taken to mean that the message is transmitted after the associated module has contended for use of the bus, and is, in turn, granted use of the bus.)

Switch module 125 removes the message from bus 130, replaces the address and channel number contained in the header with an address and channel assigned to control module 115 and then places the result on bus 135. As mentioned above, LAN 100 modules monitor bus 135 and thus remove from bus 135 messages which contain their respective addresses. Accordingly, control module 115 removes from bus 135 the message originated by module 110-1. Control module 115, in turn, relates the name contained in a destination field of the message, i.e., the name assigned to computer 155, with module 110-3 and sends to the latter module via bus 130 and bus 135 a message requesting whether the named device will accept the connection. Module 110-3, in turn, removes the message from bus 135, deletes its address from the message and sends the remainder to computer 155 via bidirectional communication path 156. If computer 155 finds that it can accept the connection, then it returns to module 110-3 a message indicative of that fact. Module 110-3 upon receipt thereof prefixes to the message a header containing the module 110-3 address and the channel number that will be used for the connection. (It is assumed herein that the module 110-3 address is 32 and that the latter channel number is 64.) Module 110-3 then sends the message to control module 115 via bus 130.

Upon receipt of the module 110-3 message, control module 115 establishes a virtual connection between terminal 140-1 and host computer 155 via modules 110-1 and 110-3, respectively. Control module 115 does this by entering in memory 120 at a location reserved for module 110-1 and indexed by the channel number (i.e., 7) that the module 110-1 will use for the connection the address of module 110-3 (32) and the channel number (64) that module 110-3 will use for the connection, as shown in FIG. 2.

In particular, FIG. 2 indicates that control module 115 has assigned to module 110-1 sixteen memory 120 locations (collectively designated 120-1). The starting address of those memory locations is determined using a conventional memory mapping technique in which a module address is translated into a memory location. In addition, the associated channel number is used as a memory index. Thus, address eight assigned to module 110-1 is translated into the memory 120 location representing the starting point of memory block 120-1. Accordingly, control module 115 stores at the memory 120 location indirectly defined by the address (i.e., eight) assigned to module 110-1 and indexed by the associated channel number 7 the address of module 110-3 (i.e., 32) and channel number 64. Similarly, control module 115 stores at a memory location indirectly defined by the address of module 110-3 and indexed by the associated channel number 64 the address assigned to module 110-1 and channel number 7, thereby establishing a virtual circuit connection between modules 110-1 and 110-3 via switch module 125.

Specifically, module 110-1 prefixes to each message that it receives from terminal 140-1 a header bearing a source address, i.e., the address of module 110-1 and channel number 7, and transmits the result over bus 130, which is connected to switch module 125. Upon receipt of the message, module 125 translates the source address into a destination address. That is, control module 125 (a) translates the module address and channel number contained in the received message into a control memory 120 location, (b) unloads the module address and channel number which was priorly stored at that location and which defines a destination address, and (c) loads the destination address into the received message in place of the source address. Switch module 125 then transmits the message to broadcast bus 135. Of all of the modules that monitor the bus 135, only module 110-3 will find that the message contains its address. Accordingly, module 110-3 removes the message from the bus, deletes its associated address therefrom, and then supplies the message to computer 155. Similarly, switch 125 upon receiving via bus 130 a message having a header bearing a source address formed from the address of module 110-3 and channel number 64 translates that source address, in the manner just discussed, into a destination address defining the address of module 110-1 and channel number 7. Switch 125 then transmits the message to bus 135. Similarly, module 110-1 finding that the message header contains its address removes the message from bus 135, deletes its address and associated channel number from the header and sends the remainder to terminal 110-1.

A similar approach is used to transport a Connection Oriented (CONS) message from one LAN, e.g., LAN 100, to another LAN, e.g., LAN 200. In particular, if the first message that module 110-1 had sent to control module 115 identified as the destination computer 160, rather than computer 155, then control module 115 would relate the name of computer 155 with trunk module 110-2 and send the message to the latter module via a signaling channel, switch 125 and bus 135. Upon receipt of the message, module 110-2 would delete its destination address from the message and transmit the result to LAN 200 via communication path 150 connecting LAN 100 to LAN 200.

A LAN 200 trunk module connected to the other end of path 150 would then add its source address to the message and pass the result to the LAN 200 control module via the LAN 200 transmit bus. The LAN 200 control module would then relate the named destination contained in the message with a LAN 200 port module and send the message to the latter, in the manner discussed above. Computer 160 would then return to the LAN 200 control module via its associated port module a message indicating whether or not it would accept the requested connection. If computer 160 accepts the connection, then the LAN 200 control module establishes in its associated control memory a virtual circuit connection between the port module serving computer 160 and the LAN 200 trunk module connected to path 150. Similarly, control module 115 would establish in control memory 120 a virtual circuit connection between modules 110-01 and 110-2, all in the manner described above. At that point, terminal 140-1 and computer 160 may then exchange messages via the virtual circuit connections respectively established in LANs 100 and 200. We now turn to a discussion directed to the manner in which a LAN, e.g., LAN 100 of FIG. 1, that is arranged to transport a connection oriented message, may also be arranged to transport a connectionless message.

DETAILED DESCRIPTION

As mentioned above, a connectionless message is transported on the "fly", which means that such a message is not preceded by a call set-up procedure establishing a virtual circuit connection between the source and destination modules. Accordingly, the key in transporting a connectionless message within a system that is primarily arranged to transport connection oriented messages is to adapt the system so that the switch module processes a connectionless message the same way that it processes a connection oriented message. Another key is to arrange each port module participating in the connectionless message service so that it (a) distinguishes a connection oriented message from a connectionless message and (b) "checks" each connectionless message appearing on the broadcast (receive) bus to determine if an associated destination field contains its respective address, even though the message header may contain a different address.

The transport of connectionless messages in a system arranged to transport connection oriented messages is achieved, in accordance with the invention, by assigning to each port module participating in the transport of connectionless messages a second receiving address that is common to all participating modules in the switch node, and an additional channel number associated with the common address. In this way, a source transmit address may be readily translated into a broadcast receive address for transporting a connectionless messages, as shown in FIG. 3.

Specifically, when a LAN, e.g. LAN 100, is brought on line (booted up) the associated control module 115 polls, one at a time, each port module that is present to determine the port module's address and function (type). Armed with that information, control module 115 reserves for the polled port module a number of consecutive memory 120 locations based on the type of function performed by the polled module, as mentioned above. Of that number, N−1 are used for establishing virtual circuits to transport respective connection oriented messages (hereinafter also referred to as CONS messages) between the polled port module and other port modules, in the manner described above. The Nth of the reserved number of locations, on the other hand, is used for the transport of connectionless messages. In this instance, and as part of the polling procedure, control module 115 stores in the address field (CNLS) of the Nth reserved memory location the aforementioned common receive address, and stores in the channel number field the address of the polled module, i.e. module address (MA). (It is be understood that the module address is stored in the manner just described for the purpose of providing a convenient way of identifying the source of a connectionless message and is not required in the practice of the invention, as will become apparent below.)

Figure 3:
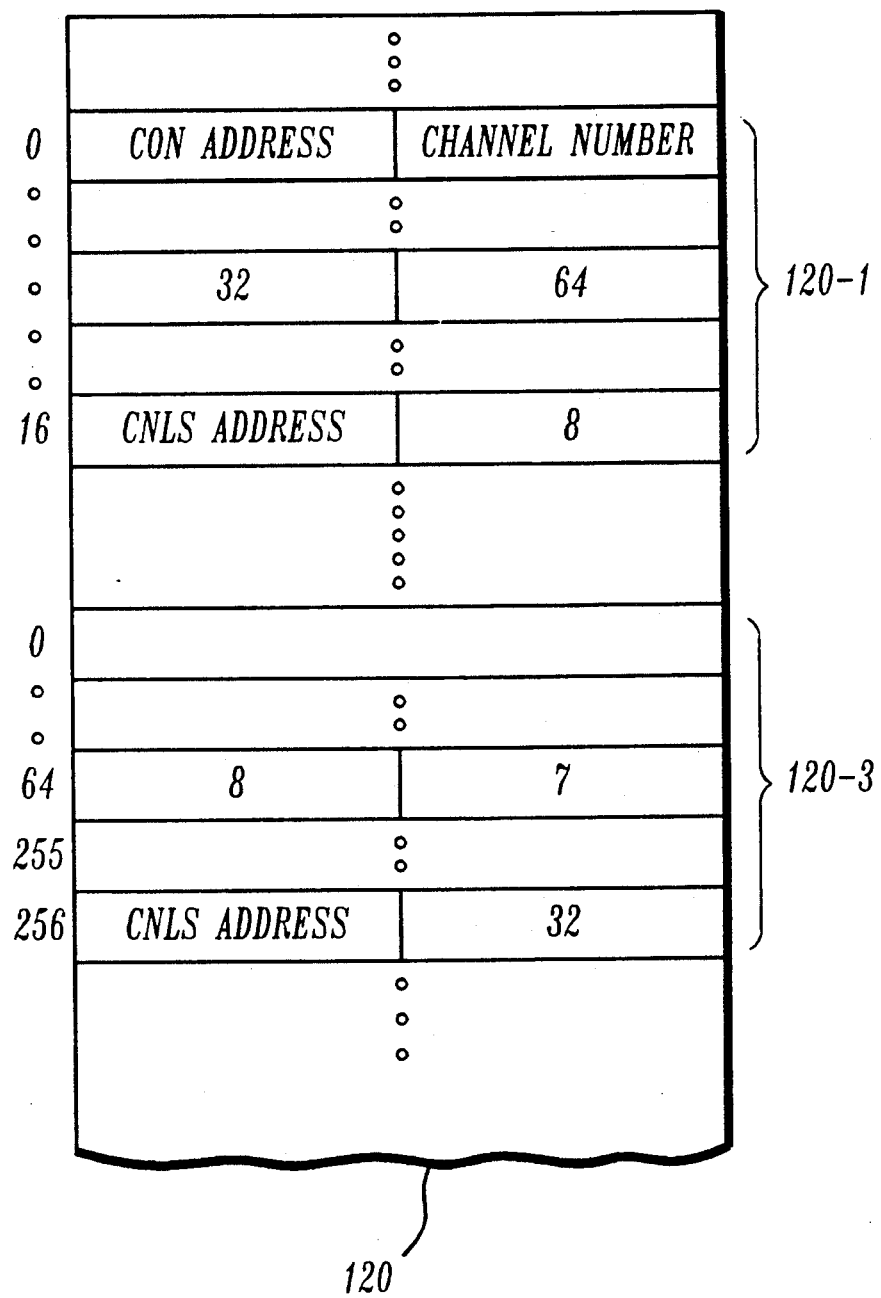
FIG. 3 illustrates the manner in which the translation table of FIG. 3 is adapted to provide the means for establishing a quasi-virtual circuit connection to transport connectionless messages.

For example, it is seen from FIG. 3, that control module 115 has reserved a number—illustratively seventeen—of memory locations 120-1 to port 110-1 module, as compared with the prior number of—illustratively sixteen—shown in FIG. 2. In accordance with the invention, control module 115 stores in the CNLS field of the seventeenth of the memory locations 120-1 a common address (CNLS address) and stores in the channel number field the address of module 110-1, which address is assumed to be eight, as mentioned above. In an illustrative embodiment of the invention, the common receive address is an address that is not assigned to one of the port modules as a primary address. It will be assumed herein that such an address is the value 511. Accordingly, port module 115 store in the CNLS field of the Nth location of block 120-1 the value 511. Similarly, as a result of polling module 110-3, control module 115 reserves for that module a block of 257 consecutive memory locations, in which the first 256 of those locations is used to transport CONS messages and in which the 257th location is used to transport connectionless messages. Moreover, control module 115 stores in the CNLS field of the 257th memory location the common address 511 and stores in the associated channel number field the address assigned to module 110-3, i.e., 32. Control module 115 similarly processes the remaining port modules as it polls them one at a time. It is further assumed for the purpose of the present illustrative example that the value of the secondary receive address that is assigned to each module participating in the connectionless message service is illustratively—511. It is to be understood, of course, that the mechanism for setting this value is not germane to the present invention.

Once the aforementioned polling procedure has been completed, then the port modules that participate in connectionless service may begin to handle such messages. In particular, a connectionless message typically originates at a network that is primarily arranged to transport connectionless messages. In such a network, a connectionless message is transported on the fly without the benefit of being preceded by a call set-up procedure. That is, a message is transported by inserting in the message header the address of the source (originator) of the message and the address of the destination. The process of transporting a connectionless message from one such network to another, but different network, for example, the network of FIG. 1, requires that both networks use essentially the same message format.

Figure 4:
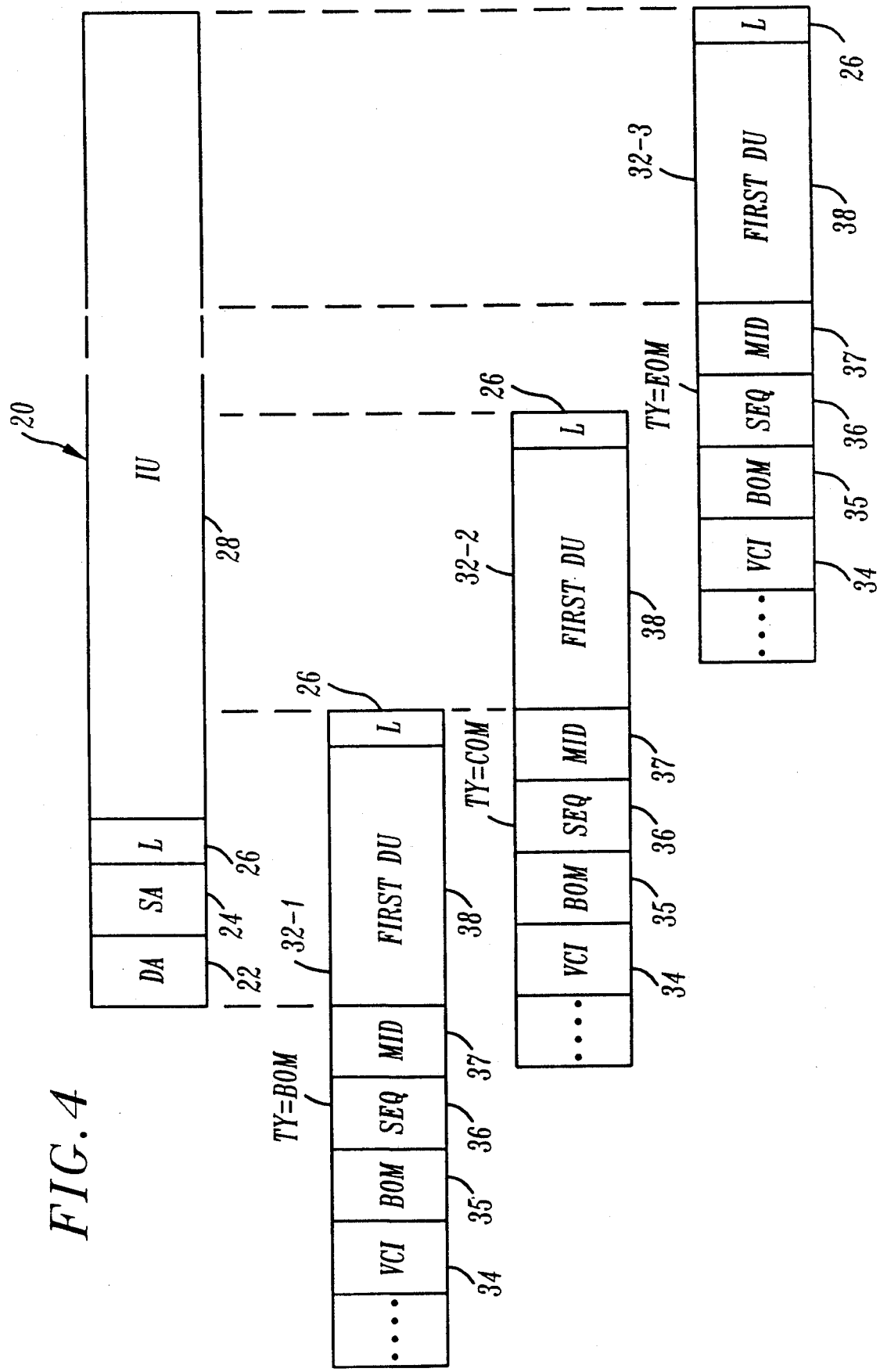
FIG. 4 shows an illustrative example of a message format that may be used to transport messages among the nodes of FIG. 1.

In an illustrative embodiment of the invention, the message format prescribed by the well-known IEEE standard 802.6 for Metropolitan Area Networks (MAN) is used to transport both CONs and connectionless messages. (The 802.6 proposed standard is disclosed in publication number P802.61D6, dated Jul. 13, 1990, entitled *Proposed Standard-Distributed Queue Dual Bus (DQDB) Metropolitan Area Network (MAN)*, which is available from the IEEE and which is incorporated herein by reference.) A somewhat abbreviated and generalized version of that format is shown in FIG. 4. In particular, message 20, which is of variable length, includes, inter alia, address fields 22 and 24 for the destination address (DA) and source address (SA), respectively, which may be in a 48- or 64-bit format, and unrelated to the module addresses and channel numbers used within the packet switch. The message also includes a message length field (L) 26 and an information field (IU) 28. In accordance with the format, a variable length message, such as message 20, is segmented into a number of data units (DU), with each data unit comprising, more or less, 53 so-called bytes with each byte comprising 8 bits.

The first data unit (DU) 32-1 contains the destination and source address fields DA and SA as well as a DU length field (L) 26. The remaining data units 32-2 through 32-3 are logically linked to the first data unit by a message identification (MID) 37, which is uniquely associated with the source (sender) of the message. Thus, the value contained in the MID field allows the recipient to identify all of the associated data units and to form them into the original message 20.

The message sequence (SEQ) 36 of each data unit is used to detect a loss of or unsequenced delivery of data units having the same MID value. Each data unit 32-1 through 32-3 also contains a virtual circuit identifier field (VCI) 34, which is used to identify a message unit as either a CONs or connectionless message, as will be explained below. However, it suffices to say at this point that each of the bits of field 34 is set to a logical one (1) if the data unit is associated with a connectionless message. If, on the other hand, the data unit is associated with a CONs message, then the VCI field defines the module address and channel number of the source or recipient based on whether the data unit is respectively contained on the transmit bus 130 or receive bus 135. The type field (TY) 35 specifies how the MID field and associated information field 38 of a message unit should be interpreted. That is, field 35 specifies the first (beginning) message unit (BOM), continuing message unit(s) (COM) and last (ending) message unit (EOM) of message 20. Field 35 also specifies whether a message segment is a complete message, referred in the 802.6 format as a Single Segment Message (SSM).

With the foregoing in mind, we will now discuss an example of the way in which a LAN, e.g., LAN 100, processes a connectionless message in which the originator of the message is, for example, another network, e.g., node M shown in FIG. 1. It is assumed that modules 110-9 and 110-N of LAN 100 (FIG. 1) participate in the connectionless message service. It is also assumed that module 110-9 receives the message via communication path 157 and that module 110-N transmits the message to another network N (FIG. 1) via communication path 158.

Figure 5:
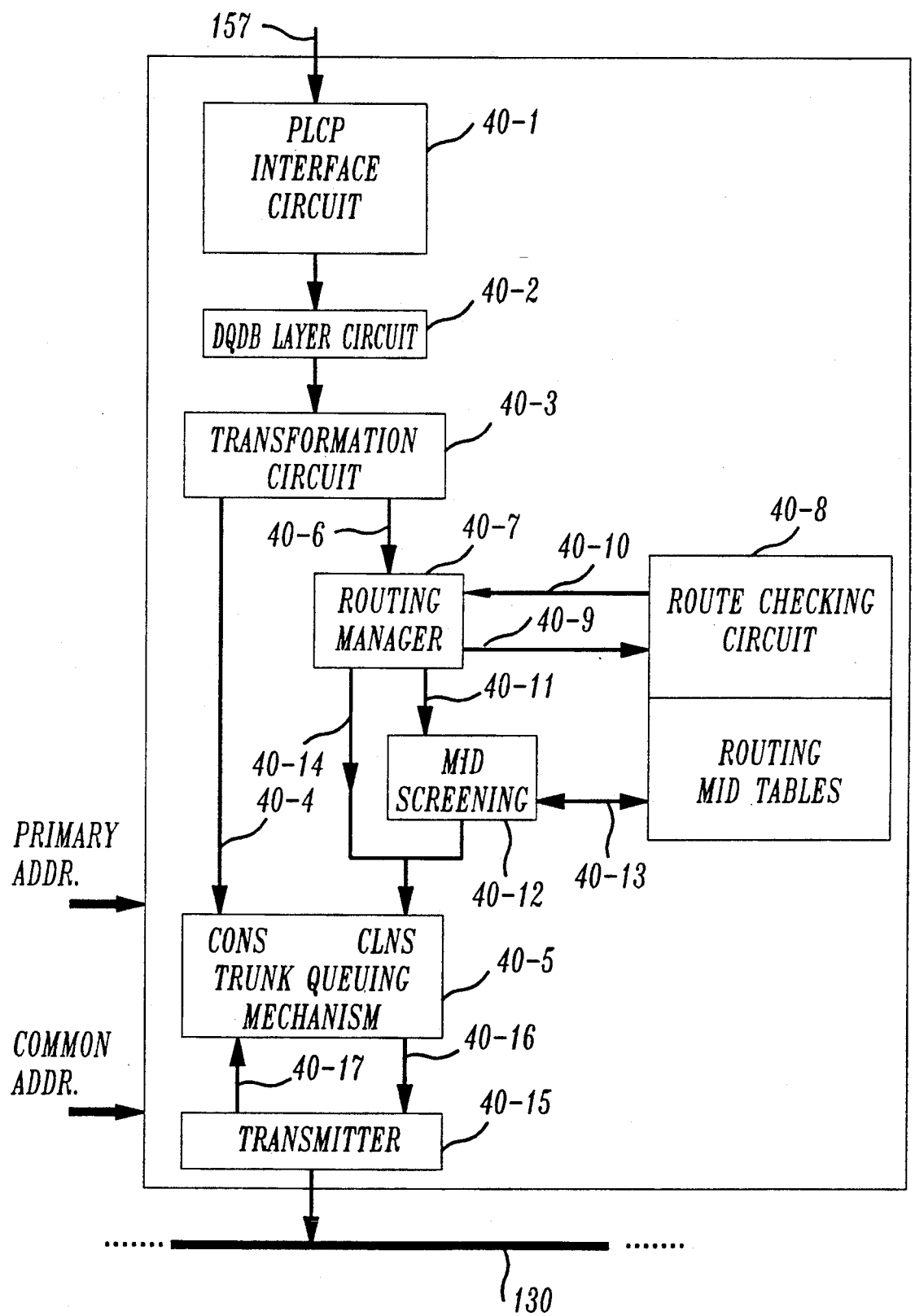
FIG. 5 shows a functional block diagram of a transmitter module arranged in accordance with the principles of the invention to receive from an external communication path either connection oriented service or connectionless service messages and place such messages onto a common transmit bus contained within the LAN of FIG. 1.

Referring now to FIG. 5, there is shown a block diagram of a transmitter circuit 40 which is contained in module 110-9, and which interfaces module 110-9 with communication path 157. Specifically, logical values of data bits carried over a transmission facility, e.g., communication path 157, are defined by respective voltage levels. Interface circuit 40-1, inter alia, decodes the voltage levels defining such data bits into logical ones and zeroes, in which the data bits form a so-called PLCP data frame (as defined in the aforementioned proposed 802.6 standard) composed of a number of slots with each slot containing a message segment. Once a data frame has been decoded, then interface 40-1 extracts therefrom the respective message segments and checks each segment for data errors. Message segments free of errors are then passed to DQDB (Distributed Queue Dual Bus) circuit 40-2. DQDB circuit 40-2, inter alia, implements a number of functions defined in the aforementioned proposed 802.6 standard based on whether the associated LAN is either at the head or tail of a so-called DQDB bus. These functions include (a) head or tail bus function, (b) MID page allocation, and (c) queued arbitrated (QA) function. The head of bus function includes marking slots and the writing of so-called management information octets. The MID page allocation function participates in a DQDB protocol with other network nodes (LANs) to control the allocation of MID values. The QA function accepts a message segment and adds a header thereto on behalf of higher entities in the layered protocol.

Transformation circuit 40-3 operates to transform the 802.6 format of the received message into a modified version thereof. As mentioned above, a standard 802.6 message segment comprises 53 bytes (octets) with each byte comprising eight bits. It can be appreciated that such a format is not compatible with most electronic devices. e.g., a microcomputer, which process bit strings comprising some multiple of four bits. To be compatible with such devices, transmit bus 130 as well as broadcast bus 135 (not shown in the Figure) is designed to carry a multiple of four bits—illustratively 32 bits (i.e., four bytes of data with each byte comprising eight bits). Accordingly, transformation circuit 40-3 rearranges the format of the received 802.6 message segment into a 52 byte segment by deleting therefrom a number of non-essential bits and rearranging a number of data fields so that the result is some multiple of four bytes.

After completing such transformation, transformation circuit 40-3 checks the VCI field of the received segment to determine if it is a CONS or connectionless message (CLNS). (It is noted that the 802.6 standard specifies that each bit of the VCI field is set to a logical one if the associated segment is connectionless message segment, as mentioned above.) If the VCI field is not "all ones" (indicating that the segment is a CONS message), then circuit 40-3 passes the segment to message queue 40-5 via bus 40-4. Otherwise, circuit 40-3 passes the message segment to routing manager circuit 40-7 via bus 40-6.

Routing manager circuit 40-7 checks the type field of the message and passes to route checking circuit 40-8 via bus 40-9 the message's destination address and message identification (MID) if the type field indicates that the connectionless message segment is either a BOM or SSM. If the type field indicates that message segment is either a COM or EOM, then routing manager circuit 40-7 passes the message segment to MID screening circuit 40-12 via bus 40-11. Route checking circuit 40-8 compares the received destination address with predetermined routing addresses contained in a routing table stored in internal memory associated with circuit 40-8. (Route checking circuit 40-8 does this to determine if receiver 40 should be the recipient of the message segment.) If the destination address is contained in the routing table, then route checking circuit 40-8 sets to a first binary value—illustratively one—a memory element (bit) of a MID map contained in the associated memory, in which the location of that element in the map is defined by the value of the received MID. In addition, route checking circuit 40-8 returns to routing manager circuit 40-7 via lead 40-10 a first predefined signal indicating that receiver 40 should receive the message. However, if the destination address is not contained in the routing table, then route checking circuit 40-8 returns via lead 40-10 a second predefined signal indicating that receiver 40-10 should not receive the message segment.

Routing manager circuit 40-7, in turn, either discards or passes the message segment to message queue 40-5 responsive to receipt via lead 40-10 of either the latter or former signal, respectively. Similarly, message screening circuit 40-12 reads via bus 40-13 the memory element whose location is defined by the value of the MID associated with the received message segment to determine if receiver 40 should receive messages bearing that MID. If the value of the addressed element is set to the first binary value, then circuit 40-12 passes to message queue 40-5 the received message. In addition, circuit 40-12 sets the aforementioned memory element to a second binary value—illustrative zero—if the received message segment is of the EOM type. However, circuit 40-12 discards the message segment if the value of the addressed element is found to be a zero, indicating that the received message segment had not been preceded by a BOM message segment.

Message queue 40-5 is a conventional FIFO memory arrangement which accepts data words (bytes) via bus 40-4 or 40-14 and stores them in a FIFO as they are received. In addition, message queue 40-5, responsive to receipt of a request via lead 40-17, unloads a data word from the FIFO and passes it to transmitter circuit 40-15 via bus 40-16.

Transmitter 40-15 operates to unload each data word of a message segment that is stored in the circuit 40-5 FIFO and temporarily store the data word (byte) in an associated register circuit that is sized to hold a number—illustratively four—of such data words. When the register contains the first four bytes of a message segment, which include the VCI field, then transmitter 40-15 changes the value of the VCI bits to reflect its associated port module (board) address and associated channel number. That is, if the message segment is of the connection oriented type then the channel number is the number that transmitter 40-15 reserved for the associated CON message MID. If, on the other hand, the VCI bits indicate that the message segment is a connectionless message, then the channel number is the Nth number priorly assigned to module 110-4 to transmit connectionless messages. Transmitter 40-15 then supplies the contents of the register to transmit bus 130. Transmitter 40-15 continues to unload the remaining data words from the aforementioned FIFO until the complete message segment has been supplied to bus 130.

As mentioned above, a message that is placed on transmit bus 130 is transported to switch module 125. Switch module 125 upon receipt of the message, unloads the contents of a control memory 120 (FIG. 1) memory location that is indirectly defined by the board address and indexed by the associated channel number contained in the received message segment. If the message is a CONS message segment, then such memory contents define the port module (primary) address and an associated channel number of a module that is connected, via a virtual circuit connection, to the module whose primary address is contained in the VCI field of the received message. If the message is a connectionless message, then such memory contents define the aforementioned common, secondary address and module address of the module that sent the message segment. In either case, switch module 125 loads the contents of the aforementioned memory 120 location into the VCI field of the received message, and then places the result on broadcast bus 135. Thus, in accordance with an aspect of the invention, switch module 125 processes (translates) a connectionless message the same way that it processes CONS message.

Accordingly, switch module 125 translates the VCI field of the connectionless message segment that it receives from transmitter 40-15 into the common address and address of module 110-4, and then places the message on broadcast bus 135. Those modules which participate in connectionless message service monitor the bus for messages which not only bear their respective primary module addresses, i.e., CONS messages, but which also bear the common, secondary receive address. One such module would be module 110-N.

Figure 6:
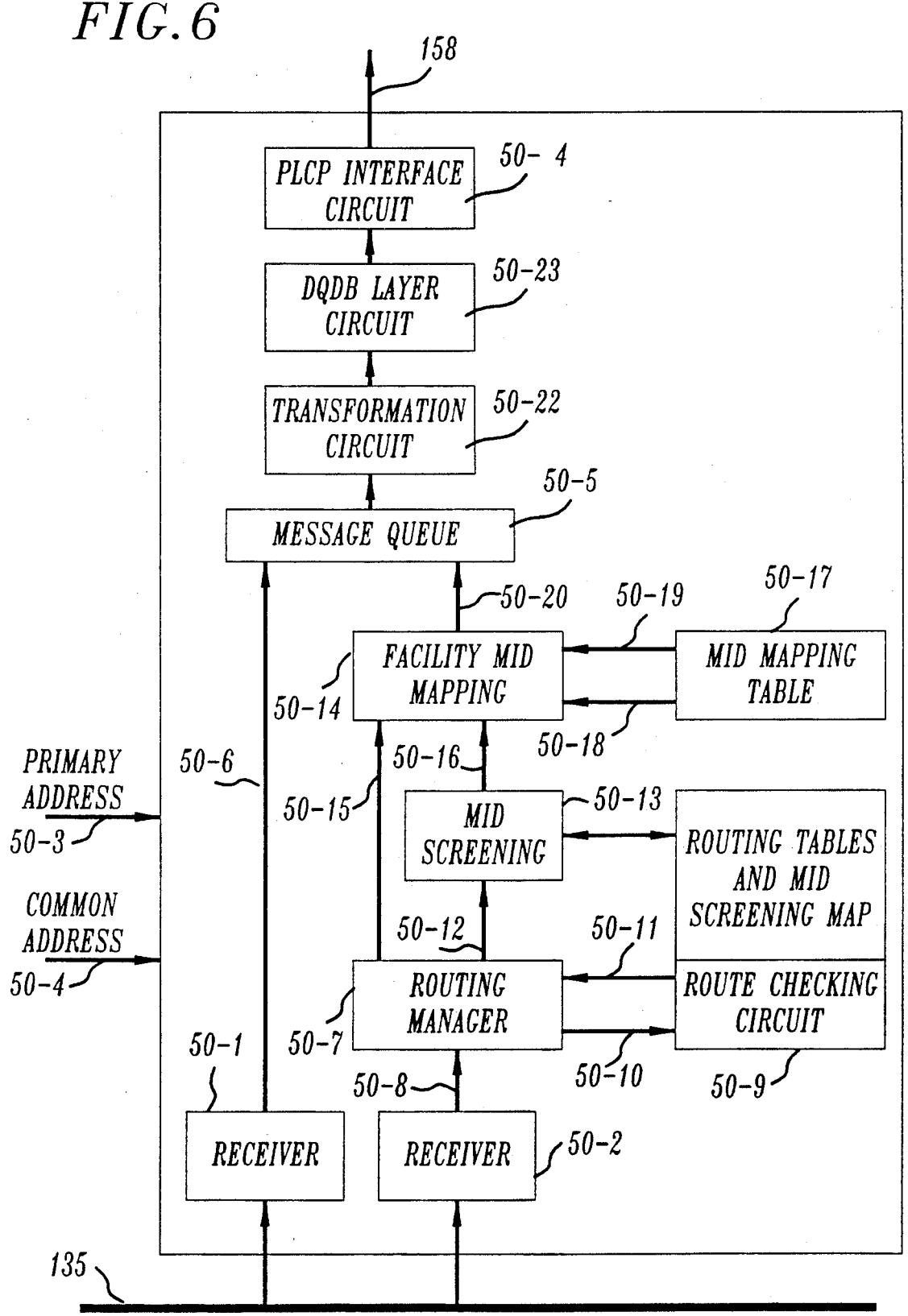
FIG. 6 shows a functional block diagram of a receiver module arranged in accordance with the principles of the invention to remove from a common broadcast bus contained within the LAN of FIG. 1 either connection oriented or connectionless service messages and transmit such messages to an external communication path.

Turning now to FIG. 6, there is shown a functional block diagram of a receiver circuit 50 which interfaces a module, e.g., module 110-N, with broadcast bus 135. It is seen from FIG. 6, that some of the functions performed by circuit 50 are somewhat similar to functions performed by circuit 40 of FIG. 5.

In particular, bus receiver circuits 50-1 and 50-2 monitor and accept from broadcast bus 135 a leading string of data words of a message segment and store them in respective internal register circuits. Bus receiver circuits 50-1 and 50-2 then compare the module address defined in the VCI field 35 (FIG. 4) contained in the received data words with an address stored in a respective address register. For receiver circuit 50-1, the latter address is the module's unique primary address supplied via bus 50-3 and, for receiver circuit 50-2, the latter address is the common, secondary receive address supplied via bus 50-4. If either receiver 50-1 or 50-2 finds that the result of the compare function is true, then the receiver accepts from bus 135 the remaining data words of the message segment. The accepting receiver circuit (50-1 or 50-2) then passes the message segment through a conventional error checking process (e.g., a parity checking process). If no error is detected and the message is a (a) CONS segment, then the segment is passed to message queue 50-5 via bus 50-6; or (b) connectionless message segment, then the segment is passed to routing manager circuit 50-7 via bus 50-8.

Like routing manager circuit 40-7 (FIG. 5) routing manager circuit 50-7 passes to route checking circuit 50-9 via bus 50-10 the destination field 22 of the received segment if the associated type field 36 indicates that the segment is either a BOM or SSM. If not, then routing manager circuit 50-7 passes the segment to MID screening circuit 50-13 via bus 50-12.

Route checking circuit 50-9 compares the destination address that it receives with a table of predetermined destination addresses to determine if module 110-N should forward to node M the received connectionless message segment. This determination is made to help ensure that the message segment is forwarded to it's destination via the shortest network path.

For example, assume that the destination address contained in the message segment identifies a module contained in a node P (not shown in the FIGS.) connected to node M (FIG. 1) via a respective communication path, and that another LAN 100 module (not shown in the FIGS.), which also participates in the connectionless message service, is connected directly to node P via another communication path. Accordingly, the shortest path to the aforementioned destination would be via the other LAN 100 module, rather than module 110-N and node M. (It is noted that the contents of such a routing table may be externally configured and controlled by a network administrator who determines the destination addresses that are stored in the table.) The route checking circuit contained in the other module would thus conclude, as a result of consulting its table of destination addresses, that its associated other module should forward the connectionless message segment. Whereas, route checking circuit 50-9 would conclude, as a result of consulting its table of destination addresses, that its associated module should not forward the connectionless message segment. In the latter instance, route checking circuit 50-9 would return via lead 50-11 the aforementioned second predefined signal, which would cause routing manager 50-7 to discard the connectionless message segment.

However, it is assumed in the present illustrative example, that route checking circuit 50-9 determines that module 110-N should forward the connectionless message segment. As a result of that determination, route checking circuit 50-9 notes the associated segment MID in memory, in the manner described above. In addition, circuit 50-9 returns to routing manager 50-7 via lead 50-11 the aforementioned first predefined signal, which causes routing manager 50-7 to pass the connectionless message segment to facility MID mapping circuit 50-14.

(It is noted that if the segment is either COM or EOM, then routing manager 50-7 would pass the segment to MID screening circuit 50-13 via bus 50-12.)

MID screening circuit 50-13 processes a COM and EOM message segments similar to the way that MID screening circuit 40-12 (FIG. 5) processes COM and EOM segments. Accordingly, the above discussion directed to MID screening circuit 40-12 pertains equally well to MID screening circuit 50-13. Therefore, it suffices to say at this point that MID screening circuit 50-13 passes to MID mapping circuit 50-14 via bus 50-16 a COM or EOM message segment circuit if the memory element representing the value of the MID contained in the segment had been priorly set to a binary value of one. Similarly, if MID screening circuit 50-13 finds that the pertinent memory element had not been so set, then it discards the message segment.

As mentioned above, each module of a node or LAN (e.g., LAN 100) is assigned a unique set of message identification values (MIDs) to identify messages that they originate. However, such MID values are unique only within the operating environment of the associated LAN (node). Which means that they are not unique across a group of LANs forming a network of LANs. It can therefore be appreciated that modules associated with different LANs could use identical MIDs, which possibly could cause a routing problem to occur when a node (e.g. LAN 100) sends to another node (e.g., LAN M) a message.

To address this potential problem, facility MID mapping circuit 50-14 is arranged translate a MID value contained in a connectionless message segment that circuit 50-14 is currently processing into a MID value associated with a receiver module of the node (e.g., node N) connected to the opposite end of transmission facility 158. To do such translation, then, the MID values assigned to the node N receiver circuit are also stored, in accord with an aspect of the invention, in MID mapping table 50-17. Accordingly, upon receiving from routing manager 50-7 a BOM or SSM connectionless message segment facility MID mapping circuit 50-14 passes to MID mapping table 50-17 via bus 50-18 a copy of the BOM, VCI and MID fields. Circuitry associated with MID mapping table 50-17 and responsive to receipt of those fields searches the MID mapping table for an unused MID, which is returned to circuit 50-14 via bus 50-19. In the case of a BOM message, the circuitry reserves the unused MID so that it may be used to transport subsequent associated COM and EOM message segments. That is, upon receipt of the COM (EOM), VCI and MID fields of a message segment, such circuitry translates the values contained in those fields into the reserved MID value and returns the latter value via bus 50-19. If the message segment happens to be an EOM segment, then the circuitry cancels the reserved MID, thereby making the MID value available for transporting message segments associated with another information unit 20 (FIG. 4).

Facility MID mapping circuit 50-14, in turn, replaces (overwrites) the value contained in the MID field of the current message segment with the reserved value that it receives via bus 50-19, and then passes to message queue 50-5 the resulting message segment.

Message queue 50-5 comprises a number of conventional FIFOs—illustratively two FIFOs. One FIFO is used for queuing high priority messages and the other FIFO is used for queuing low priority messages. In an illustrative embodiment of the invention, and for both CONS and connectionless messages, high priority is assigned to particular message segments, for example, BOM and SSM message segments, and low priority is assigned to other message segments, for example, COM and EOM message segments. Accordingly, upon receipt of a message segment via either bus 50-6 or 50-20, message queue 50-5, in a conventional manner, stores the segment in its high-priority FIFO if the segment is either a BOM or SSM. Otherwise, message queue 50-5 stores the segment in its low-priority FIFO. Message queue 50-5 processes (unloads) messages contained in its high-priority queue first and then passes such segments to transformation circuit 50-22 via bus 50-21 as they are unloaded from the high-priority queue. When the high-priority queue is empty, then message queue 50-5, in a similar manner, processes messages that are contained in its low-priority queue, if any.

Transformation circuit 50-5 performs a function similar to, but opposite to that performed by transformation circuit 40-3. That is, transformation circuit 50-5 transforms (rearranges) a message segment that it receives into the aforementioned 802.6 format. Accordingly, transformation circuit 50-5 adds to such a message segment the aforementioned non-essential bits and, for a connectionless message segment changes each of bits of the VCI field to a logical (binary) one.

DQDB layer circuit 50-23 is similar to DQDB layer circuit 40-2. Accordingly, the discussion directed to circuit 40-2 pertains equally to circuit 50-23.

PLCP interface circuit 50-24 performs a function similar to, but opposite to that performed by PLPC interface circuit 40-1. That is, interface circuit 50-24, inter alia, forms into a facility superframe the various message segments that it receives and transmits the frame to communication path 158. In doing so, interface circuit 50-24 converts the various bit values forming such segments into respective voltage levels.

The foregoing is merely illustrative of the principles of our invention. Those skilled in the art will be able to devise numerous arrangements, which, although not explicitly shown or described herein, nevertheless embody those principles that are within the spirit and scope of the invention.

We claim:

1. A system for providing data communications among a plurality of data communication modules comprising means, responsive to receipt of individual circuit requests from respective ones of said modules, for establishing respective virtual connections prior to actual use of said connections, said modules being associated with respective primary addresses and individual ones of said modules also being associated with a common, secondary address, said primary addresses being used for transmitting and receiving a first type of data packet and said secondary address being used to receive a second type of data packet, means for selectively activating each of said requested virtual connections at the time they are actually used to transmit said first type of data packet, and means, responsive to one of said individual ones of said modules having transmitted a data packet of said second type, for selectively activating a predefined virtual connection not associated with a circuit request so that said transmitted second type of data packet may be transported to those of said modules that are associated with said secondary address.

2. The system set forth in claim 1 wherein said transmitted second type of data packet includes the primary address associated with said one of said individual ones of said modules and a reserved channel number, and wherein said system further comprises means, operative before said transmitted data packet is transported to said modules associated with said secondary address, for changing said primary address and said reserved channel number contained in said transmitted second type of data packet to said secondary address and said primary address associated with said one module, respectively,.

3. The system set forth in claim 1 wherein said system is a virtual circuit packet switch.

4. A data communications system comprising a plurality of digital devices, individual ones of said devices being arranged to process a number of different types of message services, said system comprising means for associating said devices with respective primary addresses and associating ones of said devices also with a common, secondary address, said primary addresses and said secondary address being used in association with first and second types of said message services, respectively means, responsive to receipt of a request originated by one of said devices, for establishing a virtual connection between said one device and another one of said devices and for selectively activating said virtual connection only when said one device and said another device exchange messages associated with said first type of service, and means, responsive to receipt, from said one device, of a message associated with said second type of service, for selectively activating a common, predefined virtual connection and for forwarding said second type of message to those of said devices associated with said secondary address.

5. The data communications system set forth in claim 4 wherein said first type of message service is a connection oriented message service and said second type of message service is a connectionless message service.

6. The data communications system set forth in claim 4 wherein said virtual connection between said one and said another devices comprises transmit and receive paths and wherein when said second type of message is transmitted over said transmit path it contains the primary address associated with the originator of the message and wherein said system further comprises means, responsive to said second type of message being contained on said transmit bus, for changing the primary address contained in said message to said secondary address and transmitting said changed second type of message over said receive bus for receipt by those of said devices associated with said secondary address.

7. The data communications system set forth in claim 4 wherein said predefined virtual connection is partially defined by said common, secondary address.

8. The data communications system set forth in claim 4 wherein said data communications system is a virtual circuit packet switch.

9. A system for providing data communications between a plurality of data modules, each of said modules having a unique address and a number of associated channel numbers, said system comprising means for routing a first type of message from a first one of said modules to a second one of said modules via a path defined by their respective addresses and associated channel numbers, and means for routing a second type of message from said first module to a third one of said modules via a path defined by the address of said first module and a predetermined channel associated with said first module and further defined by an address common to at least said first and third modules.

* * * * *